(12) United States Patent
Kojima

(10) Patent No.: US 10,283,815 B2
(45) Date of Patent: May 7, 2019

(54) PRODUCTION METHOD OF LAMINATE FOR A BATTERY

(71) Applicant: TOYOTA JIDOSHA KABUSHIKI KAISHA, Toyota-shi, Aichi-ken (JP)

(72) Inventor: Shinji Kojima, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 15/144,364

(22) Filed: May 2, 2016

(65) Prior Publication Data

US 2016/0329602 A1 Nov. 10, 2016

(30) Foreign Application Priority Data

May 8, 2015 (JP) ................. 2015-096065

(51) Int. Cl.
*H01M 10/0585* (2010.01)
*B23K 26/352* (2014.01)
*B23K 26/0622* (2014.01)
*H01M 10/0562* (2010.01)
*B23K 26/361* (2014.01)
*B23K 101/36* (2006.01)
*B23K 103/08* (2006.01)
*B23K 103/16* (2006.01)
*B23K 103/00* (2006.01)

(52) U.S. Cl.
CPC ..... *H01M 10/0585* (2013.01); *B23K 26/0624* (2015.10); *B23K 26/352* (2015.10); *B23K 26/361* (2015.10); *H01M 10/0562* (2013.01); *B23K 2101/36* (2018.08); *B23K 2103/08* (2018.08); *B23K 2103/172* (2018.08); *B23K 2103/50* (2018.08)

(58) Field of Classification Search
CPC ....................... H01M 10/0585; B23K 26/0624
See application file for complete search history.

(56) References Cited

FOREIGN PATENT DOCUMENTS

| CN | 102255102 A | * | 11/2011 | ........ H01M 10/0436 |
|---|---|---|---|---|
| CN | 102255102 A | | 11/2011 | |
| JP | 2000-149911 A | | 5/2000 | |
| JP | 2001-015153 A | | 1/2001 | |
| JP | 2010-102985 A | | 5/2010 | |
| JP | 2010102985 A | * | 5/2010 | |
| JP | 2010-129403 A | | 6/2010 | |
| JP | 2011-243577 A | | 12/2011 | |
| JP | 2011243577 A | * | 12/2011 | ........ H01M 10/0436 |
| JP | 2015-008073 A | | 1/2015 | |
| WO | 2013/035519 A1 | | 3/2013 | |

* cited by examiner

*Primary Examiner* — Jacob T Minskey
*Assistant Examiner* — Melody Tsui
(74) *Attorney, Agent, or Firm* — Oliff PLC

(57) ABSTRACT

A method for producing a laminate for a battery in which a first active material layer and a solid electrolyte layer are stacked, includes irradiating the laminate with a laser from a side of the laminate faced by the first active material layer to remove a part of the first active material layer. The reflectance of the laser by the solid electrolyte layer is 80% or more.

16 Claims, 5 Drawing Sheets

PRODUCTION METHOD OF LAMINATE FOR A BATTERY

TECHNICAL FIELD

The present disclosure relates to a production method of a laminate for a battery, and more specifically, to a production method of a laminate for a battery where the number of processes involved in the production of the battery can be reduced, the short-circuiting of the battery can be prevented, and the performance of the battery can be enhanced.

BACKGROUND ART

In recent years, an all-solid battery in which an electrolytic solution is replaced by a solid electrolyte is attracting attention. Compared with a secondary battery using an electrolytic solution, the all-solid battery using no electrolytic solution does not cause decomposition, etc., of an electrolytic solution due to overcharge of the battery and has high cycle durability and high energy density.

The inside of such an all-solid battery includes a laminate in which a positive electrode active material layer, a solid electrolyte layer and a negative electrode active material layer are stacked with each other. The production method of this laminate generally includes the following production methods:

(1) a production method by a wet-on-dry process where a negative electrode material slurry is coated on a collector layer and dried or calcined to obtain a negative electrode active material layer and a solid electrolyte slurry is coated on the negative electrode active material layer and dried or calcined to obtain a solid electrolyte layer;

(2) a production method by a wet-on-wet process where a negative electrode active material slurry is coated to form a negative electrode active material slurry layer, a solid electrolyte slurry is coated thereon to form a solid electrolyte slurry layer, and these layers are dried or calcined to obtain a negative electrode active material layer and a solid electrolyte layer; and (3) a production method by a lamination pressing process where a positive electrode active material layer, a solid electrolyte layer, and a negative electrode active material layer are individually dried or calcined and stacked, and the laminate then is pressed.

The thus-obtained laminate for a battery may be subject to deformation by processing such as cutting, deformation due to repetition of charge and discharge, or partial breakage by vibration, etc., during use, and the positive electrode active material layer and thereby the negative electrode active material layer could contact with each other to cause a short-circuit. Accordingly, the shape, structure, etc., of the laminate for a battery that can prevent a short-circuit, and the production method thereof has been studied.

Specifically, in the production method of an all-solid battery of Japanese Unexamined Patent Publication No. 2015-008073, the positive electrode and the negative electrode are made to differ in the size of the stacking surface in an attempt to avoid the short-circuiting of the battery. The production method of an all-solid battery of Japanese Unexamined Patent Publication No. 2015-008073 includes pressing a negative electrode having a negative electrode active material layer and a first solid electrolyte layer, thereafter, cutting the edge part of the negative electrode, pressing a positive electrode having a positive electrode active material layer and a second solid electrolyte layer, thereafter, cutting the edge part of the positive electrode, stacking the negative electrode and positive electrode in such a way as to contact the first solid electrolyte layer side and the second solid electrolyte layer side respectively to obtain a laminate for the battery, and heat-pressing the laminate. In the production method of an all-solid battery of Japanese Unexamined Patent Publication No. 2015-008073, a technique of creating a difference in the size of stacking surfaces between the positive electrode and the negative electrode in the process of cutting the edge parts thereof is disclosed.

The production method of an all-solid secondary battery of Japanese Unexamined Patent Publication No. 2001-015153 includes providing, on a collector layer, a laminate for a battery in which a positive electrode active material layer, a solid electrolyte layer and a negative electrode active material layer are stacked with each other, and cutting the laminate on the collector layer by laser ablation, etc. In the production method of an all-solid secondary battery of Japanese Unexamined Patent Publication No. 2001-015153, a technique of processing the laminate for a battery by irradiating a laser to the side opposite the collector layer of the laminate and, when the laser reaches aluminum as the collector layer, the laser is reflected by the collector layer, is disclosed.

With respect to the production method of a transparent electrode substrate, the production method of Japanese Unexamined Patent Publication No. 2010-129403 includes depositing a release layer on a transparent substrate, depositing a transparent electrode layer on the release layer, and irradiating the release layer with laser light to partially vaporize the release layer and, at the same time, selectively removing the transparent electrode layer together with the release layer, thereby patterning the transparent electrode layer. In the production method of a transparent electrode substrate of Japanese Unexamined Patent Publication No. 2010-129403, a technique of making the light absorption coefficient of the transparent electrode layer for laser light at a predetermined wavelength lower than the light absorption coefficient of the release layer, thereby allowing part of the laser to be transmitted through the transparent electrode layer to selectively vaporize the release layer, is disclosed.

SUMMARY

In the production method of an all-solid battery of Japanese Unexamined Patent Publication No. 2015-008073, the positive electrode and the negative electrode are made to differ in the size of stacking surfaces attempt to prevent a short-circuit, but due to tolerance generated in each process, the energy density of the all-solid battery may be reduced.

In the production method of an all-solid secondary battery of Japanese Unexamined Patent Publication No. 2001-015153, the laminate for a battery is divided by cutting on the collector layer by laser ablation, etc., in an attempt to avoid a short-circuit of one laminate on other laminates, but there is a possibility that a short-circuit cannot be prevented.

Accordingly, an object of the embodiments is to provide a production method of a laminate for a battery, where the number of processes involved in the production of a battery can be reduced, the short-circuit of a battery can be prevented, and the performance of the battery can be enhanced.

The present inventor has found that the above-described object can be attained by the following techniques.

A first aspect relates to a production method of a laminate for a battery in which a first active material layer and a solid electrolyte layer are stacked with each other, the method including: irradiating a laser to the laminate from a side of the laminate faced by the first active material layer to remove a part of the first active material layer while maintaining the solid electrolyte layer intact, wherein the reflectance of the laser by the solid electrolyte layer is 80% or more.

A second aspect relates to a method according to the first aspect, wherein the reflectance of the laser by the solid electrolyte layer is larger by 50% or more than a reflectance of the laser by the first active material layer.

A third aspect relates to a method according to the first aspect, wherein a reflectance of the laser by the first active material layer is 30% or less.

A fourth aspect relates to a method according to any one of the first through third aspects, wherein the laser is at least one of a solid laser, a gas laser, a liquid laser, and a semiconductor laser.

A fifth aspect relates to a method according to any one of the first through fourth aspects, wherein the solid electrolyte layer contains at least one solid electrolyte selected from the group consisting of a sulfide-based amorphous solid electrolyte, a sulfide-based crystalline solid electrolyte, an oxide-based amorphous solid electrolyte, a crystalline oxide, a crystalline oxynitride, and a combination thereof.

A sixth aspect relates to a method according to any one of the first through fifth aspects, wherein the laminate further has a second active material layer stacked on a second side of the solid electrolyte layer opposite a first side of the solid electrolyte layer on which the first active material layer is stacked.

A seventh aspect relates to a method according to the sixth aspect, wherein the laminate further has a collector layer stacked on the second active material layer.

An eighth aspect relates to a method according to the sixth or seventh aspect, wherein after the irradiation of the laser, an area of a stacking surface of the first active material layer is smaller than an area of a stacking surface of the second active material layer.

A ninth aspect relates to a method according to any one of the sixth through ninth aspects, wherein the first active material layer is a positive electrode active material layer and the second active material layer is a negative electrode active material layer.

A tenth aspect relates to a method according to any one of the first through ninth aspects, further including drying a slurry laminate having stacked therein, in order, a first active material slurry layer and a solid electrolyte slurry layer, to form the laminate in which the first active material layer and the solid electrolyte layer are stacked with each other.

An eleventh aspect relates to a method according to any one of the sixth through ninth aspects, further including drying a slurry laminate having stacked therein, in order, a first active material slurry layer, a solid electrolyte slurry layer and a second active material slurry layer, to form the laminate in which the first active material layer, the solid electrolyte layer and the second active material layer are stacked with each other.

A twelfth aspect relates to an all-solid battery having a laminate for a battery produced by the method according to any one of the first through eleventh aspects.

The embodiments provide a production method of a laminate for a battery, in which the number of processes involved in the production of the battery can be reduced, the short-circuiting of the battery can be prevented, and the performance of the battery can be enhanced.

DETAILED DESCRIPTION

Figure 1A:
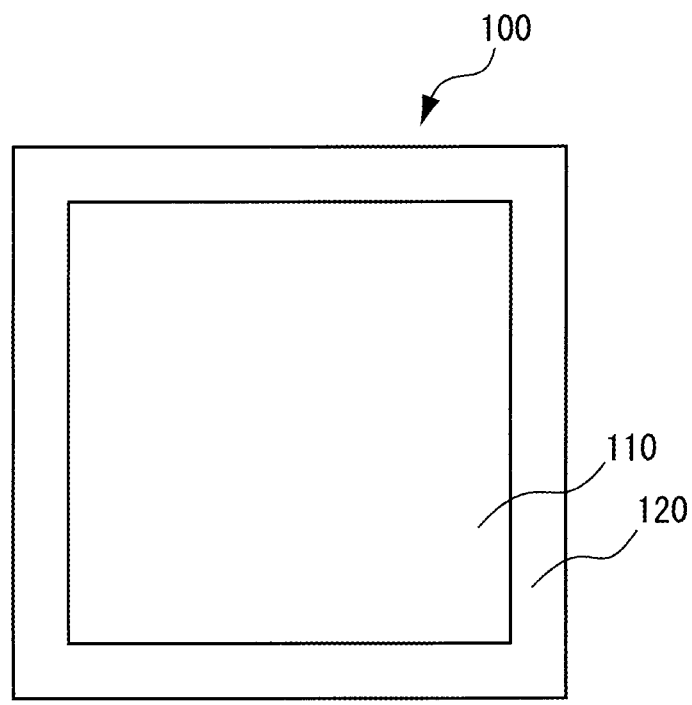
FIG. 1(a) is a schematic front view of the laminate for a battery produced by the method of embodiments.

Embodiments are described in detail below. The following embodiments are not limiting, and various modifications are possible. In the description of the drawings, the same element is denoted by the same reference sign, and duplicate description is omitted.

In the present disclosure, the "first active material layer" means a positive electrode active material layer or a negative electrode active material layer, the "second active material layer" means a negative electrode active material layer or a positive electrode active material layer, respectively.

<<Laminate for a Battery>>

In the present method, a laminate for a battery in which a first active material layer and a solid electrolyte layer are stacked with each other is produced.

As described above, in the conventional laminate for a battery, the positive electrode active material and the negative electrode active material are made to differ in the size of stacking surface w in an attempt to avoid the short-circuiting of a battery. However, it has been difficult to produce a battery electrode ensuring that the energy density of the battery can be enhanced while preventing the short-circuiting of the battery.

One of the reasons why the production of such a laminate for a battery is difficult is the conventional production method of a laminate for a battery. The production method of a laminate for a battery generally includes drying or calcining an active material slurry, etc., or pressing an active material layer, etc. In the drying or calcining process, variations such as a decrease in the slurry volume occur, and in the pressing process, variations such as the expansion and contraction or filling factor of a layer, occur. Such a change causes an error in the production and as the number of processes increases, the error increases. As a result, production of a laminate for a battery having a thickness, structure, etc., corresponding to design value is difficult and the energy density of the battery cannot be enhanced.

In addition, for example, one might prepare a laminate in order to produce a laminate for a battery having a thickness, structure, etc., corresponding to design values; thereafter, process the laminate into any shape; and thereby correct and minimize the error in production generated in a plurality of processes.

In this connection, for the purpose of obtaining an all-solid battery having a high output, the thickness of a solid electrolyte layer, etc., of the laminate is generally very thin and, for example, of a micrometer level. Specifically, the conduction distance between a lithium ion and an electron is shortened by employing a laminate having a thickness of a micrometer level, particularly, a laminate having a solid electrolyte layer with a thickness of a micrometer level, and thereby an all-solid battery having a high output can be obtained.

The method for processing the laminate includes a general thermal cutting method, for example, a laser cutting method, a gas cutting method, and a plasma cutting method.

Furthermore, the laser cutting method is a cutting method where a cutting region is irradiated with a laser in which the energy density is increased by being passed through a condensing lens, to heat and evaporate the cutting region and at the same time, an assist gas is blown onto the cutting region to remove the melt. The gas cutting method is a cutting method where the cutting region is heated to a temperature not less than the ignition temperature; oxygen is blown onto the cutting region to cause an oxidation (heat generation) reaction; and the molten oxide and the like is removed by the oxygen flow. The plasma cutting method is a cutting method where a high voltage is applied to a gas; and thereby the produced arc plasma is blown onto the cutting region to cut the region. In general, the kerf width (the width removed in association with cutting) is large in the order of laser cutting method, gas cutting method and plasma cutting method, and the quality of the cutting surface is worse in this order.

In the case of applying the above-described general cutting method to a laminate having a thickness of a micrometer level, particularly, a laminate having a solid electrolyte layer with a thickness of a micrometer level, all layers of the laminate can be cut, but cutting or removal of a specific layer, for example, part of an active material layer, of the laminate is very difficult.

In this way, it has been difficult for the conventional technique to produce a laminate suitable for a battery, particularly, a laminate having a solid electrolyte layer with a thickness of a micrometer level, under the condition of a predetermined shape, structure, etc.

However, the disclosed method for producing a laminate for a battery includes removing part of the first active material layer while maintaining the solid electrolyte layer when irradiating a laser to the laminate for a battery from the first active material layer side (i.e., from the side of the laminate faced by the first active material layer), by virtue of the reflectance of a specific laser by the solid electrolyte layer being 80% or more.

In the case of irradiating a laser to the removing region, the laser follows a pathway such as transmission, absorption and reflection. In the above-described general laser cutting or removing method, among others, absorption is an important factor, because when the laser absorption by the cutting or removing region, particularly, the absorptivity value, is large, the heating and evaporation efficiency of the removing region is improved, as a result, the removal efficiency in the removing region is enhanced.

On the other hand, the inventor has achieved the disclosed embodiments by focusing attention on the laser reflection, particularly, the reflectance. Specifically, the inventor has found that when the laser reflectance by the solid electrolyte layer is a high value, in particular 80% or more, when the laminate for a battery is irradiated with a laser from the first active material layer side, breakage, cutting or removal of part of the solid electrolyte layer can be prevented while removing part of the first active material layer.

Generally, when a laser is irradiated to a layer with a thickness of a micrometer level, the layer could be thermally cut. However, the present inventor found that the particular laser and the particular solid electrolyte layer can be selected and thereby the laser reflectance by the solid electrolyte layer can be increased.

Furthermore, the laser reflectance by the solid electrolyte layer depends on the material(s) of which the solid electrolyte layer consists and the laser wavelength. Therefore, in order to increase the laser reflectance by the solid electrolyte layer, the combination of a major solid electrolyte of which the solid electrolyte layer consists and the laser wavelength may be, for example, taken into account.

In addition, the laser wavelength to be combined with the major solid electrolyte can be defined based on a property of the major solid electrolyte. For example, where the color of the major solid electrolyte is white, the laser can be adopted which belongs to ranges from relatively short-wavelengths to relatively long-wavelengths such as from visible wavelengths to infrared wavelengths. Among ranges, with respect to a laser with relatively long-wavelength, the laser reflectance by the solid electrolyte layer containing the major solid electrolyte can be increased.

When the laminate for a battery is irradiated with a laser from the first active material layer side (i.e., from the side of the laminate faced by the first active material layer), part of the laser beam is reflected by the first active material layer, but the remaining laser beam is absorbed by the first active material layer and/or transmitted through the first active material layer. In particular, the laser transmitted through the first active material layer reaches the solid electrolyte layer.

Accordingly, when the laser reflectance by the solid electrolyte layer is 80% or more, the laser transmitted through the first active material layer is reflected by the solid electrolyte layer with a high probability, so that the breakage, etc., of part of the solid electrolyte layer can be prevented.

In addition, since part of the laser reflected by the solid electrolyte layer is absorbed by the first active material layer, the laser absorptivity by the first active material layer can be increased, and as a result, the removal of the first active material can be further promoted.

In general, a substance has an intrinsic processing threshold value with respect to a laser to be irradiated on to it. The processing threshold value means a laser power density ($W/cm^2$), a fluence ($J/cm^2$), etc., necessary for stably performing the laser processing. Therefore, when a laser power density, etc., of a laser is less than the processing threshold value, a to-be-processed substance cannot be stably processed. In other words, when the laser power density, etc., is less than the processing threshold value, the to-be-processed substance is less likely to be affected by the laser.

Although not intending to be bound by theory, it is believed that when the laser reflectance by the solid electrolyte layer is a high value, in particular 80% or more, the laser power density, etc., of the laser transmitted through the first active material layer and applied directly to the solid electrolyte layer can be reduced to near or less than the processing threshold value of the solid electrolyte layer.

This is thought to occur because when the laminate for a battery is irradiated with a laser from the first active material layer side, the amount of laser power transmitted through the first active material layer is reduced due to laser reflection and absorption by the first active material layer and since the laser reflectance by the solid electrolyte layer is 80% or more, the total amount of laser absorptivity and transmittance by the solid electrolyte layer is 20% or less of the laser reaching the solid electrolyte layer.

Furthermore, in the case where the laser reflectance by the solid electrolyte layer is 80% or more, it is difficult to damage (e.g., break, etc.) the solid electrolyte layer even when the laser is applied directly to the solid electrolyte layer due to removal of the first active material layer.

Accordingly, when the laser reflectance by the solid electrolyte layer is 80% or more, for example, the process of cutting the positive electrode active material layer and the negative electrode active material layer before stacking can be omitted, and the number of processes at the time of production of a battery can be reduced. In addition, a laminate for a battery having a thickness, shape, etc., corresponding to design values can be produced, so that short-circuiting of a battery can be prevented and the performance of the battery can be enhanced.

Figure 1B:
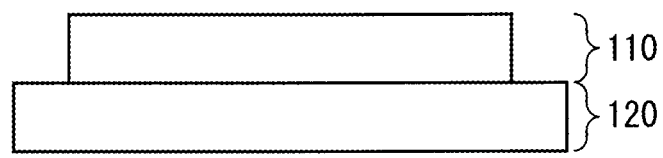
FIG. 1(b) is a side view of the laminate for a battery of FIG. 1(a).

A laminate for a battery where part of the first active material layer is removed by irradiating a laser to the laminate from the first active material layer side (i.e., from the side of the laminate faced by the first active material layer) is explained by referring to FIGS. 1(a)-1(b). FIG. 1(a) is a schematic plan view of the laminate for a battery produced by the method of the present disclosure, and FIG. 1(b) is a front view of the laminate1 of FIG. 1(a).

In the laminate 100 of FIGS. 1(a) and 1(b), a first active material layer 110 and a solid electrolyte layer 120 are stacked. In the laminate 100, part of the first active material layer 110, i.e., the peripheral edge part, is removed by irradiating a laser to the laminate 100 from the first active material layer 110 side. In addition, since the laser reflectance by the solid electrolyte layer 120 is 80% or more, the peripheral edge part of the first active material layer 110 is removed and at the same time, the solid electrolyte layer 120 is prevented from breaking, etc., The laser reflectance by the solid electrolyte layer includes, from the standpoint of inhibiting laser absorption and transmission by the solid electrolyte layer, a reflectance of 80% or more, more preferably 82% or more, more preferably 84% or more, more preferably 86% or more, more preferably 88% or more, and even more preferably 90% or more.

In the present disclosure, the laser "reflectance" means a value obtained by irradiating light having the same wavelength as the laser, to each of a reference and a solid electrolyte layer, etc., measuring the reflected light intensities ($I_{reference}$ and $I_{solid\ electrolyte}$, etc.), and then calculating the reflectance from the intensities according to the following formula (I):

$$\text{Reflectance (\%)} = (I_{solid\ electrolyte\ layer,\ etc.}/I_{reference}) \times 100 \quad (I)$$

The measurement of the reflectance can be performed by using an ultraviolet-visible-near infrared spectrophotometer (Model: UV-2600, manufactured by Shimadzu Corporation) and, as an option, an integrating sphere (Model: ISR-2600Plus, manufactured by Shimadzu Corporation). The reference is a material obtained by compacting a powdered $BaSO_4$.

The laser reflectance by the first active material layer is not particularly limited, as long as the laser reflectance by the solid electrolyte layer is 80% or more.

In the case where the laser reflectance by the first active material layer is small, the laser absorptivity by the first active material layer rises, and the removal of part of the first active material layer is thereby facilitated. For this reason, the laser reflectance by the first active material layer includes, from the standpoint of promoting laser absorption by the first active material layer, a reflectance of 30% or less, more preferably 28% or less, more preferably 26% or less, more preferably 24% or less, more preferably 22% or less, and even more preferably 20% or less.

In the method for producing a laminate for a battery, the laser reflectance by the solid electrolyte layer is preferably larger by 50% or more than the laser reflectance by the first active material layer.

The present inventor has found that as the laser reflectance by the solid electrolyte layer is larger than the laser reflectance by the first active material layer, when the laminate is irradiated with a laser from the first active material layer side, the effect of preventing breakage, cutting or removal of part of the solid electrolyte layer while removing part of the first active material layer, can be enhanced.

Such a difference in the reflectance is believed to enable the laser to efficiently be incident into the first active material layer and enable the solid electrolyte layer to efficiently reflect the laser.

Furthermore, the laser reflectance by the solid electrolyte layer is larger by 50% or more than the laser reflectance by the first active material layer, so that breakage, etc., of the solid electrolyte can be efficiently prevented while removing a specific layer, for example, part of the first active material layer, which has any shape, volume, etc., This is believed to be achieved because the laser reflectance by the solid electrolyte layer is larger by 50% or more than the laser reflectance by the first active material layer, the effect of enabling the laser to efficiently be incident into the first active material layer and of enabling the solid electrolyte layer to efficiently reflect the laser, is more enhanced.

Accordingly, the value obtained by subtracting the laser reflectance by the first active material layer from the laser reflectance by the solid electrolyte layer includes, from the standpoint of facilitating the removal of part of the first active material layer and at the same time, efficiently preventing the breakage, etc., of part of the solid electrolyte layer, a value of 50% or more, more preferably 53% or more, more preferably 56% or more, more preferably 60% or more, more preferably 65% or more, and even more preferably 70% or more.

In the method for producing a laminate for a battery, the laminate for a battery further has, on the side opposite the side having the first active material layer, a second active material layer stacked on the solid electrolyte layer.

In the laminate for a battery, a first active material layer, a solid electrolyte layer and a second active material layer; for example, a positive electrode active material layer, a solid electrolyte layer and a negative electrode active material layer, are stacked, whereby ion delivery/acceptance occurs between the positive electrode active material layer and the negative electrode active material layer through the solid electrolyte layer.

In the method for producing a laminate for a battery, the laminate for a battery further has a collector layer stacked on a side of the second active material layer opposite the side that contacts the solid electrolyte layer.

The collector layer can be made conductive to the outside in terms of electron delivery/acceptance accompanying the ion delivery/acceptance.

In the method for producing a laminate for a battery, after the laser irradiation, an area of the stacking surface of the first active material layer is smaller than an area of the stacking surface of the second active material layer.

Conventionally, with respect to the removal amount of part of the first active material layer, which is necessary for preventing short-circuiting of a battery, there has been a possibility that the removal amount may be too large or too small. However, in the present method, part of the first active material layer can be removed accurately, without being too large or too small, in an amount necessary for preventing short-circuiting of a battery, by virtue of using a laser. Therefore, a laminate for a battery can be produced where the energy density of the battery can be enhanced while preventing the short-circuiting of the battery.

It is preferred that the first active material layer is a positive electrode active material layer and the second active material layer is a negative electrode active material layer.

In the case of charging an all-solid battery, generally, an ion species, for example, a lithium ion, moves from the positive electrode active material layer to the negative electrode active material; this ion is reduced to a metal; and this metal is incorporated into the negative electrode active material layer (intercalation). If the area of the stacking surface of the negative electrode active material layer is smaller than the area of the stacking surface of the positive electrode active material layer or these areas are the same, the metal which is not incorporated into the negative electrode active material layer may precipitate, for example, in dendrite form which can result in short-circuiting.

However, in an all-solid battery including a laminate for a battery produced by the present method, the area of the stacking surface of the positive electrode active material layer is smaller than the area of the stacking surface of the negative electrode active material layer, so that the generation of dendrite, etc., can be inhibited.

The order of stacking respective layers of the laminate for a battery is preferably an order of, from the top, a positive electrode active material layer, a solid electrolyte layer and a negative electrode active material layer. A positive electrode active material layer susceptible to cracking is disposed on the top, and a negative electrode active material layer insusceptible (or less susceptible) to cracking is disposed on the bottom, whereby the positive electrode active material layer can be prevented from cracking at the time of pressing the laminate for a battery.

The method for producing a laminate for a battery further includes drying a slurry laminate having stacked therein, in order, an active material slurry layer and a solid electrolyte slurry layer, to form the laminate for a battery in which the first active material layer and the solid electrolyte layer are stacked with each other.

The wet-on-wet process makes it possible to reduce the number of processes involved in the production of a laminate for a battery, save time and/or decrease the opportunity for mixing of impurities such as metal pieces. Furthermore, in this process, with respect to the first active material layer and the solid electrolyte layer each formed by drying or calcining a plurality of stacked slurry layers, the adhesion performance can be improved at the interface between layers. As a result, the electrical conductivity, impact resistance, etc., of the battery can be enhanced.

The method for producing a laminate for a battery further includes drying a slurry laminate having stacked therein, in order, a first active material slurry layer, a solid electrolyte slurry layer and a second active material slurry layer, to form the laminate for a battery in which the first active material layer, the solid electrolyte layer and the second active material layer are stacked with each other.

By this method, for example, a slurry laminate having a first active material slurry layer, a solid electrolyte slurry layer and a second active material slurry layer can be produced en bloc.

In the conventional laminate for a battery, a first active material slurry layer, a solid electrolyte slurry layer and a second active material slurry layer are dried individually, but in the laminate for a battery produced by the present method, the drying process for these layers is performed en bloc and at the same time, the above-described performances of the battery can be enhanced.

The process of applying an optional second active material slurry on an optional collector layer to form a second active material slurry layer; the process of applying a solid electrolyte slurry on the optional second active material slurry layer to form a solid electrolyte slurry layer; and the process of applying a first active material slurry on the surface of the solid electrolyte slurry layer to form a first active material slurry layer may be performed simultaneously or sequentially.

A coating method for the slurry, although there are no particular limitations thereon, can be a known coating method, such as one that uses a blade coater, a gravure coater, a dip coater, a reverse coater, a roll knife coater, a wire bar coater, a slot die coater, an air knife coater, a curtain coater, or an extrusion coater, or a combination thereof.

After the process of stacking the slurries, the process of drying and/or calcining the slurries and/or the process of pressing may be employed. As the drying and/or calcining process, although there are no particular limitations thereon, a known drying and/or calcining process may be employed. As the pressing process, although there are no particular limitations thereon, a known pressing process may be employed.

The temperature of drying and/or calcining of the slurries is not particularly limited and includes a temperature of from room temperature to 500° C. The pressing pressure is not particularly limited as long as a predetermined filling factor of each layer can be achieved. The pressing pressure includes, for example, a pressure of from 100 to 1,000 MPa.

The method for producing a laminate for a battery may further employ, without particular limitation, conventional wet-on-dry processes, a conventional lamination pressing process, other known production processes for an all-solid battery, or a combination thereof.

<Laser>

The laminate for a battery is irradiated with a laser from the first active material layer side.

The laser is not particularly limited as long as the laser reflectance by the solid electrolyte layer is 80% or more. The laser can be a solid laser, a gas laser, a liquid laser, a semiconductor laser, other lasers, and a combination thereof. From the standpoint that a high-output laser advantageous to the processing of the laminate for a battery is obtained, the laser is preferably a solid laser.

The solid laser includes, for example, a ruby laser, a glass laser, a titanium sapphire laser, an alexandrite laser, a Er:YAG laser, a Nd:YAG laser, a Nd:YVO$_4$ laser, a Yb:Fiber, and a combination thereof.

The gas laser includes, for example, a CO$_2$ laser, a He—Ne laser, a HeCd laser, a copper vapor laser, a gold vapor laser, a N$_2$ laser, an excimer XeF laser, an excimer XeCl laser, an excimer KrF laser, an excimer ArF laser, an Ar laser, and a combination thereof.

The liquid laser includes, for example, a dye laser.

The semiconductor laser includes, for example, a GaAlAs laser, an InGaAsP laser, and a combination thereof.

Other lasers include, for example, a free electron laser.

The laser may be an n-th harmonic laser (n is a natural number) formed by applying means such as non-linear optical crystal to the laser above.

The laser oscillation may be a continuous oscillation (CW) or a pulse oscillation. Among these, the laser oscillation is preferably a pulse oscillation, particularly, a femtosecond-scale pulse oscillation. In general, the energy of a pulse oscillation laser is instantaneously higher than the energy of a continuous oscillation laser, and the femtosecond-scale pulse oscillation is by far faster than the picosecond-scale vibration of an atomic lattice. Therefore, the femtosecond-scale pulse oscillation laser scarcely causes thermal damage to the parts around a laser irradiation region and can accurately and rapidly remove the irradiation region.

On this account, as the laser power density for continuous oscillation, a power density of 20 kW/cm$^2$ or more, or 25 kW/cm$^2$ or more, is preferred, and a power density of 1,500 kW/cm$^2$ or less, or 800 kW/cm$^2$ or less, is preferred.

As the fluence for pulse oscillation, a fluence of 0.5 J/cm$^2$ or more, 1.3 J/cm$^2$ or more, or 3.0 J/cm$^2$ or more, is preferred, and a fluence of 30.0 J/cm$^2$ or less, or 23.0 J/cm$^2$ or less, is preferred.

With respect to the pulse oscillation, it is noted that as the pulse width is smaller, the peak power is larger, and therefore it is easy to carry out the processing. The pulse width as used herein means the duration per pulse.

The laser wavelength is not particularly limited as long as the laser reflectance by the solid electrolyte layer is 80% or more.

In order to make the laser reflectance by the solid electrolyte layer be 80% or more, the main laser wavelength includes, for example, a wavelength of 1.0 μm or more, 1.1 μm or more, 1.2 μm or more, 1.3 μm or more, 1.4 μm or more, and 1.5 μm or more.

<First Active Material Layer>

The first active material layer may be a positive electrode active material layer or a negative electrode active material layer.

(Positive Electrode Active Material Layer)

The positive electrode active material layer contains a positive electrode active material, an optional electrical conduction aid, a binder, and a solid electrolyte.

The positive electrode active material includes a metal oxide containing lithium and at least one transition metal selected from manganese, cobalt, nickel and titanium, for example, lithium cobaltate ($Li_xCoO_2$) and lithium nickel cobalt manganate ($Li_{1+x}Ni_{1/3}Co_{1/3}Mn_{1/3}O_2$), and a combination thereof.

The form of the positive electrode active material is preferably a powder. The average particle diameter of the positive electrode active material is not particularly limited, but from the standpoint of increasing the contact area at the solid-solid interface, the average particle diameter includes, for example, an average particle diameter of 1 μm or more, 3 μm or more, 5 μm or more, and 10 μm or more, and an average particle diameter of 100 μm or less, 50 μm or less, 30 μm or less, or 20 μm or less. The average particle diameter of the positive electrode active material is preferably an average particle diameter of 1 to 50 μm, more preferably an average particle diameter of 1 to 20 μm, still more preferably an average particle diameter of 1 to 10 μm, yet still more preferably an average particle diameter of 1 to 6 μm.

In the present disclosure, unless otherwise indicated, the "average particle diameter" indicates an arithmetic mean value of measured values obtained by measuring the equivalent-circle diameter (Heywood diameter) of randomly selected 10 or more particles by means of a scanning transmission electron microscope (STEM), an energy dispersive X-ray analysis (EDX), etc.

The positive electrode active material may have an optional buffer film. A metal sulfide having high electric resistance may be generated due to occurrence of a chemical reaction between the positive electrode active material; and a sulfide-based amorphous solid electrolyte and/or a sulfide-based crystalline solid electrolyte. The buffer film above has an effect of, for example, inhibiting the generation of a metal sulfide. Due to this effect, the output of an all-solid battery can be enhanced.

The buffer film preferably exhibits an electron insulating property and ion conductivity, and contains an anion species having a strong cation binding power. The buffer film includes, for example, $LiNbO_3$, $Li_4Ti_5O_{12}$, $Li_3PO_4$, and a combination thereof.

The thickness of the buffer film as a coating of the positive electrode active material is not particularly limited but includes, for example, a thickness of 1 to 100 nm, a thickness of 1 to 50 nm, a thickness of 1 to 20 nm, and a thickness of 1 to 10 nm.

The thickness of the buffer film can be measured by using, for example, a transmission electron microscope (TEM).

The electrical conduction aid includes a carbon material, for example, VGCF (Vapor Grown Carbon Fiber) carbon black, acetylene black (AB), Ketjen black (KB), carbon nanotube (CNT) and carbon nanofiber (CNF), a metal material, and a combination thereof.

The binder is not particularly limited but includes a polymer resin, for example, polyvinylidene fluoride (PVDF), butadiene rubber (BR) and styrene butadiene rubber (SBR), and a combination thereof.

As the solid electrolyte, although there are no particular limitations thereon, a raw material applicable can be used. The solid electrolyte includes a sulfide-based amorphous solid electrolyte, for example, $75Li_2S-25P_2S_5$; a sulfide-based crystalline solid electrolyte, for example, $Li_{3.24}P_{0.24}Ge_{0.76}S_4$; an oxide-based amorphous solid electrolyte, for example, $Li_2O$—$B_2O_3$—$P_2O_5$ and $Li_2O$—$SiO_2$; a crystalline oxide or oxynitride, for example, LiI, $Li_3N$, $Li_5La_3Ta_2O_{12}$, $Li_7La_3Zr_2O_{12}$, $Li_6BaLa_2Ta_2O_{12}$, $Li_3PO_{(4-(3/2)w)}N_w$ (w is less than 1), $Li_{3.6}Si_{0.6}P_{0.4}O_4$, $Li_{1.3}Al_{0.3}Ti_{0.7}(PO_4)_3$, and $Li_{1+x+y}A_xTi_{2-x}Si_yP_{3-y}O_{12}$ (A is Al or Ga; $0 \leq x \leq 0.4$, $0 < y \leq 0.6$); and a combination thereof. In view of having excellent lithium ion conductivity, the solid electrolyte is preferably a sulfide-based amorphous solid electrolyte and/or a sulfide-based crystalline solid electrolyte.

The form of the solid electrolyte is preferably a powder. The average particle diameter of the solid electrolyte is not particularly limited, but from the standpoint of increasing the contact area at the solid-solid interface, for example, an average particle diameter of 0.1 to 20 μm is preferred, an average particle diameter of 0.2 to 10 μm is more preferred, an average particle diameter of 0.3 to 6 μm is still more preferred, and an average particle diameter of 0.5 to 3 μm is yet still more preferred.

(Negative Electrode Active Material Layer)

The negative electrode active material layer contains a negative electrode active material. The negative electrode active material layer preferably further contains an electrical conduction aid, a binder and/or a solid electrolyte.

The negative electrode active material is not particularly limited as long as it can store/release a metal ion, for example, lithium ion, but the negative electrode active material includes a metal, for example, Li, Sn, Si and In; an alloy of lithium with titanium, magnesium, aluminum, etc.; a carbon raw material, for example, hard carbon, soft carbon and graphite; and a combination thereof.

As the electrical conduction aid, binder and solid electrolyte of the negative electrode active material layer, the description related to the positive electrode active material layer may be referred to.

<Solid Electrolyte Layer>

The solid electrolyte layer contains a solid electrolyte. The solid electrolyte layer preferably further contains a binder. As the solid electrolyte and binder of the solid electrolyte layer, the description related to the positive electrode active material layer may be referred to.

<Second Active Material Layer>

As the optional second active material layer, the description related to the positive electrode active material layer and negative electrode active material layer may be referred to.

<Collector Layer>

The optional collector layer is incorporated into the laminate having the first active material layer, the solid electrolyte layer and the second electrolyte layer.

The collector layer includes a positive electrode collector layer and a negative electrode collector layer. The positive electrode collector layer and the negative electrode collector layer are not particularly limited and include various metals, for example, silver, copper, gold, aluminum, nickel, iron, stainless steel and titanium, and alloys thereof. In view of chemical stability, etc., the positive electrode collector layer is preferably an aluminum collector layer, and the negative electrode collector layer is preferably a copper collector layer.

<Others>

(Active Material Slurry)

The active material slurry includes a positive electrode active material slurry and a negative electrode active material slurry.

The positive electrode active material slurry contains a positive electrode active material. The positive electrode active material slurry preferably further contains a dispersion medium, an electrical conduction aid, a binder and/or a solid electrolyte.

The dispersion medium is not particularly limited as long as it can be stably present in the first active material layer, and the dispersion medium may include an apolar solvent, a polar solvent, or a combination thereof. The dispersion medium includes an apolar solvent, for example, heptane, xylene and toluene, and a combination thereof. The dispersion medium includes a polar solvent, for example, a tertiary amine-based solvent, an ether-based solvent, a thiol-based solvent, an ester-based solvent, or a combination thereof. The dispersion medium includes a tertiary amine-based solvent, for example, triethylamine; an ether-based solvent, for example, cyclopentyl methyl ether; a thiol-based solvent, for example, ethane mercaptan; an ester-based solvent, for example, butyl butyrate; and a combination thereof.

As the positive electrode active material, electrical conduction aid, binder and solid electrolyte of the positive electrode active material slurry, the description related to the positive electrode active material layer may be referred to.

The negative electrode active material slurry contains a negative electrode active material. The negative electrode active material slurry preferably further contains a dispersion medium, an electrical conduction aid, a binder and/or a solid electrolyte.

As the negative electrode active material, electrical conduction aid, binder and solid electrolyte of the negative electrode active material slurry, the description related to the negative electrode active material layer may be referred to. In addition, as the dispersion medium of the negative electrode active material slurry, the description related to the positive electrode active material slurry may be referred to.

(Solid Electrolyte Slurry)

The solid electrolyte slurry contains a solid electrolyte. The solid electrolyte slurry preferably further contains a dispersion medium and a binder. As the solid electrolyte and binder of the solid electrolyte slurry, the description related to the solid electrolyte layer may be referred to. In addition, as the dispersion medium of the solid electrolyte slurry, the description related to the positive electrode active material slurry may be referred to.

Embodiments are described in greater detail by referring to Examples below, but the embodiments are not limited to these Examples.

EXAMPLES

Example

Production of Positive Electrode Active Material Layer Formed on Release Sheet

A positive electrode mixture as the raw material of the positive electrode active material layer was put in a polypropylene (PP)-made vessel, stirred over 30 seconds by an ultrasonic dispersion apparatus (Model: UH-50, manufactured by SMT CO., LTD.), and shaken over 3 minutes by a shaker (Model: TTM-1, manufactured by Sibata Scientific Technology Ltd.) to prepare a positive electrode active material slurry.

This positive electrode active material slurry was applied on an Al foil as a release sheet by a blade method employing an applicator, and then dried on a hot plate at 100° C. over 30 minutes to obtain a positive electrode active material layer formed on a release sheet. By repeating the operation above, two positive electrode active material layers were respectively formed on a release sheet.

The configuration of the positive electrode mixture is shown below:

4.7 g of $LiNi_{1/3}Co_{1/3}Mn_{1/3}O_2$ (average particle diameter: 4 μm) as the positive electrode active material;

0.7 g of butyl butyrate as the dispersion medium;

2.0 g of VGCF as the electrical conduction aid;

1.8 g of a butyl butyrate solution (5 mass %) of a PVdF-based binder as the binder; and 2.2 g of a LiI-containing $Li_2S$—$P_2S_5$-based glass ceramic (average particle diameter: 0.8 μm) as the solid electrolyte.

<Production of Negative Electrode Laminate>

A negative electrode mixture as the raw material of the negative electrode active material layer was put in a polypropylene (PP)-made vessel, stirred over 30 seconds by an ultrasonic dispersion apparatus (Model: UH-50, manufactured by SMT CO., LTD.), and shaken over 30 minutes by a shaker (Model: TTM-1, manufactured by Sibata Scientific Technology Ltd.) to prepare a negative electrode active material slurry.

This negative electrode active material slurry was applied on both surfaces of a Cu foil serving as a collector layer by a blade method employing an applicator, and dried on a hot plate at 100° C. over 30 minutes to obtain a negative electrode laminate where a negative electrode active material layer is formed on both surfaces of a Cu foil as the collector layer.

The configuration of the negative electrode mixture is shown below:

2.2 g of natural graphite-based carbon (produced by Mitsubishi Chemical Corporation, average particle diameter: 10 μm) as the negative electrode active material;

0.7 g of butyl butyrate as the dispersion medium;

1.9 g of a butyl butyrate solution (5 mass %) of a PVdF-based binder as the binder; and 2.2 g of a LiI-containing $Li_2S$—$P_2S_5$-based glass ceramic (average particle diameter: 0.8 μm) as the solid electrolyte.

<Production of Solid Electrolyte Layer Formed on Release Sheet>

An electrolyte mixture as the raw material of the solid electrolyte layer was put in a polypropylene (PP)-made vessel, stirred over 30 seconds by an ultrasonic dispersion apparatus (Model: UH-50, manufactured by SMT CO., LTD.), and shaken over 30 minutes by a shaker (Model: TTM-1, manufactured by Sibata Scientific Technology Ltd.) to prepare a solid electrolyte slurry.

This solid electrolyte slurry was applied on an Al foil serving as a release sheet by a blade method employing an applicator, and dried on a hot plate at 100° C. over 30 minutes to obtain a solid electrolyte layer formed on a release sheet. By repeating the operation above, four solid electrolyte layers respectively formed on a release sheet were prepared.

The configuration of the electrolyte mixture is shown below:

2.2 g of a LiI-containing $Li_2S$—$P_2S_5$-based glass ceramic (average particle diameter: 2.0 μm) as the solid electrolyte;

0.9 g of butyl butyrate as the dispersion medium; and 1.8 g of a butyl butyrate solution (5 mass %) of a PVdF-based binder as the binder.

<Production of Laminate 1 and Laminate 2>

(Laminate 1)

The solid electrolyte layer formed on a release sheet was overlaid on one negative electrode active material layer of the negative laminate where a negative electrode active material layer is formed on both surfaces of a Cu foil. The same operation was performed for the other negative electrode active material layer of the negative electrode laminate to obtain Laminate A where a solid electrolyte layer, a negative electrode active material layer, a collector layer, a negative electrode active material layer and a solid electrolyte layer are stacked with each other in this order. Laminate A was pressed at a pressure of 400 MPa and thereafter, the release sheets of the solid electrolyte layers on both surfaces of Laminate A were peeled off.

Thereafter, the solid electrolyte layer formed on a release sheet was overlaid on one solid electrolyte layer of Laminate A. The same operation was performed for the other solid electrolyte layer of Laminate A to obtain Laminate B where two solid electrolyte layers, a negative electrode active material layer, a collector layer, a negative electrode active material layer and two solid electrolyte layers are stacked in this order. Laminate B was pressed at a pressure of 100 MPa and thereafter, the release sheets present on the solid electrolyte layers on both surfaces of Laminate B were peeled off.

Furthermore, the positive electrode active material layer formed on a release sheet was overlaid on one solid electrolyte layer of Laminate B. The same operation was performed for the other solid electrolyte layer of Laminate B to obtain Laminate C where a positive electrode active material layer, two solid electrolyte layers, a negative electrode active material layer, a collector layer, a negative electrode active material layer, two solid electrolyte layers and a positive electrode active material layer are stacked with each other in this order. Laminate C was pressed at a pressure of 400 MPa and thereafter, the release sheets present on the positive electrode active material layers on both surfaces of Laminate C were peeled off, whereby Laminate 1 was produced.

(Laminate 2)

Laminate 2 where a negative electrode active material layer, two solid electrolyte layers, a positive electrode active material layer, a collector layer, a positive electrode active material layer, two solid electrolyte layers and a negative electrode active material layer are stacked with each other in this order, was produced in the same manner as Laminate 1 other than the collector layer was replaced by an aluminum foil, and the arrangement of the negative electrode collector layer and the positive electrode active material was reversed.

<<Evaluation>>

Evaluation of the laser reflectance by the solid electrolyte layer, negative and positive electrode active material layer was performed; and evaluation of the laser processing of Laminates 1 and 2 was performed.

<Evaluation of Laser Reflectance by Solid Electrolyte Layer, Etc.>

The laser reflectance by the solid electrolyte layer, etc., was evaluated by performing reference measurement and sample measurement respectively using of light at the wavelength of the laser to calculate the reflectance from those measured values. In the reference measurement and sample measurement, each of the reference and the sample was irradiated with light having a predetermined wavelength; the intensity ($I_{reference}$ and $I_{sample}$) of light reflected was measured; and thereby the reflectance of the sample was calculated from the intensities.

The reflectance of the sample can be represented by the following formula (II):

$$\text{Reflectance (\%)} = (I_{sample}/I_{reference}) \times 100 \quad \text{(II)}$$

The apparatus used was an ultraviolet-visible-near infrared spectrophotometer (Model: UV-2600, manufactured by Shimadzu Corporation) and, as an option, an integrating sphere (Model: ISR-2600Plus, manufactured by Shimadzu Corporation); the wavelength range of light is from 220 to 1,400 nm; the reference (30 mm×30 mm) is a material obtained by manually compacting a powdered $BaSO_4$ by use of a bar; and the sample (30 mm×30 mm) prepared is respective samples of the solid electrolyte layer, negative electrode active material layer and positive electrode active material layer. Specifically, the solid electrolyte layer as the sample was disposed on the reference, and the same operation was performed for each of the negative electrode active material layer and the positive electrode active material layer.

Figure 2A:
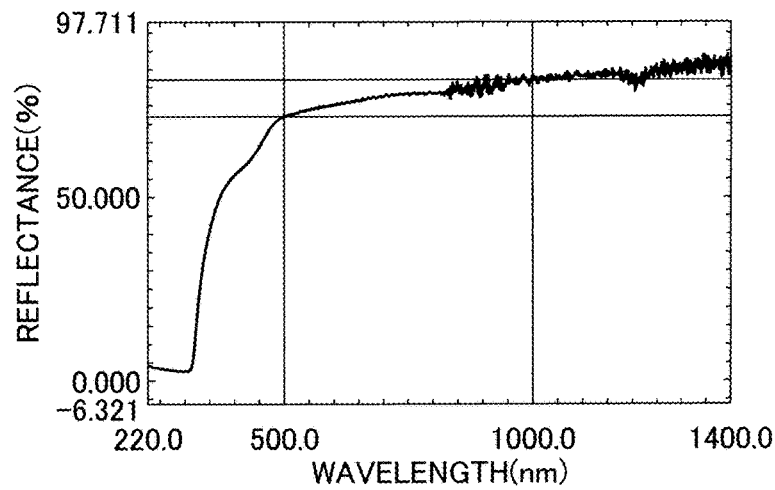
FIG. 2(a) is a view showing the relationship between the wavelength (nm) and reflectance (%) of the solid electrolyte layer.
Figure 2B:
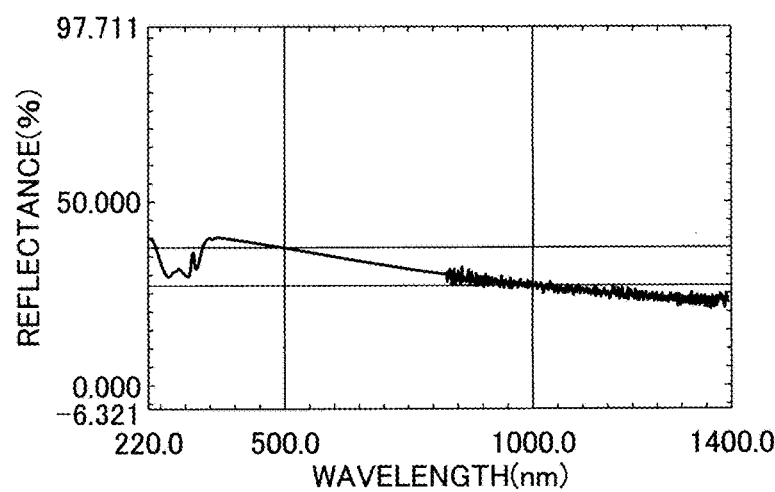
FIG. 2(b) is a view showing the relationship between the wavelength (nm) and reflectance (%) of the negative electrode active material layer.
Figure 2C:
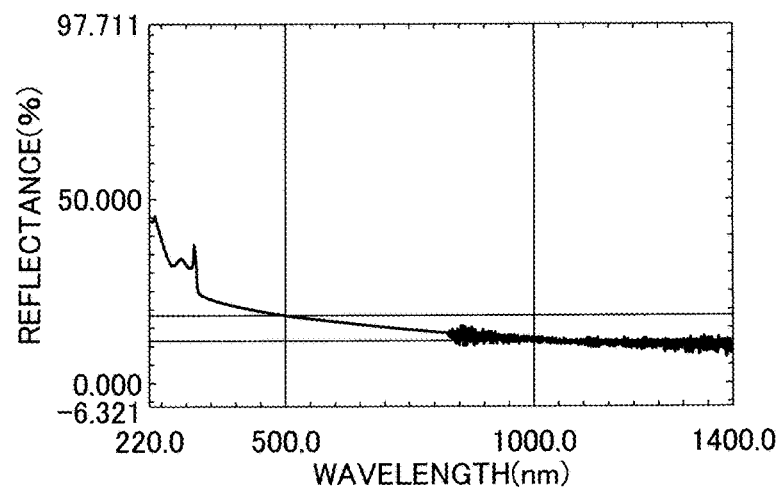
FIG. 2(c) is a view showing the relationship between the wavelength (nm) and reflectance (%) of the positive electrode active material layer.

FIG. 2(a) is a view showing the relationship between the wavelength (nm) and reflectance (%) of the solid electrolyte layer, FIG. 2(b) is a view showing the relationship between the wavelength (nm) and reflectance (%) of the negative electrode active material layer, and FIG. 2(c) is a view showing the relationship between the wavelength (nm) and reflectance (%) of the positive electrode active material layer.

It is seen from FIGS. 2(a) to 2(c) that as the wavelength of light applied to each layer varies from 220 nm to 1,400 nm, the reflectance of light applied to each layer is changed. Specifically, as the wavelength of light applied to each layer varies from 220 nm to 1,400 nm, the reflectance of light applied to the solid electrolyte layer is increased as seen from FIG. 2(a) and the reflectance of light applied to each of the negative and positive electrode active material layer is decreased as seen from FIGS. 2(b) and 2(c).

One of the reasons why the laser reflectance of the solid electrolyte layer is high is believed to be a high content of a solid electrolyte in the solid electrolyte layer. It is revealed that when the color of the solid electrolyte is bright, the solid electrolyte reflects almost all light belonging to the visible wavelength range.

It is seen from FIGS. 2(a) to 2(c) that with respect to a laser having a wavelength of 0.5 μm, the reflectance of the solid electrolyte layer is about 72%, the reflectance of the negative electrode active material layer is about 37%, and the reflectance of the positive electrode active material layer is about 18%.

In addition, it is seen from FIGS. 2(a) to 2(c) that with respect to a laser having a wavelength of 1.0 μm, the reflectance of the solid electrolyte layer is about 82%, the reflectance of the negative electrode active material layer is about 26%, and the reflectance of the positive electrode active material layer is about 11%. The results are shown in Table 1 below.

TABLE 1

| Wavelength of Light (μm) | Reflectance (%) | | |
|---|---|---|---|
| | Solid Electrolyte Layer | Negative Electrode Active Material Layer | Positive Electrode Active Material Layer |
| 0.5 | 72 | 37 | 18 |
| 1.0 | 82 | 26 | 11 |

<Evaluation of Laser Processing of Laminate>

The laser processing of the laminate was evaluated by irradiating Laminate 1 with a laser having a wavelength of 0.5 μm and irradiating Laminate 1 and Laminate 2 with a laser having a wavelength of 1.0 μm. The results are shown in FIGS. 3(a) to 5(c).

The specs of the laser having a wavelength of 0.5 μm are as follows:
the manufacturer is TRUMPF (model: TruMicro 5250);
the oscillation type is pulse oscillation; and
the fluence is 20.0 J/cm².

The specs of the laser having a wavelength of 1.0 μm are as follows:
the manufacturer is TRUMPF (model: TruMicro 7050);
the oscillation type is pulse oscillation; and
the fluence is 3.0 J/cm².

Reference Example

Figure 3A:
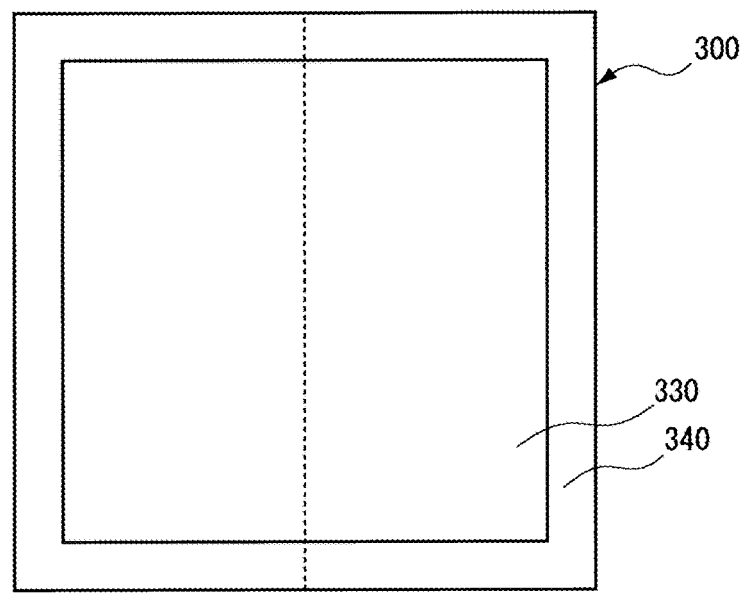
FIG. 3(a) is a schematic front view of the laminate obtained in a Reference Example.
Figure 3B:
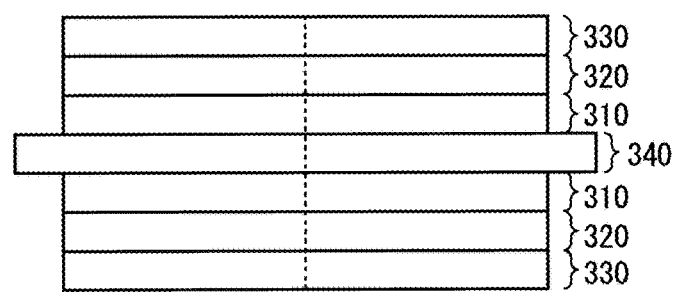
FIG. 3(b) is a side view of the laminate of FIG. 3(a)
Figure 3C:
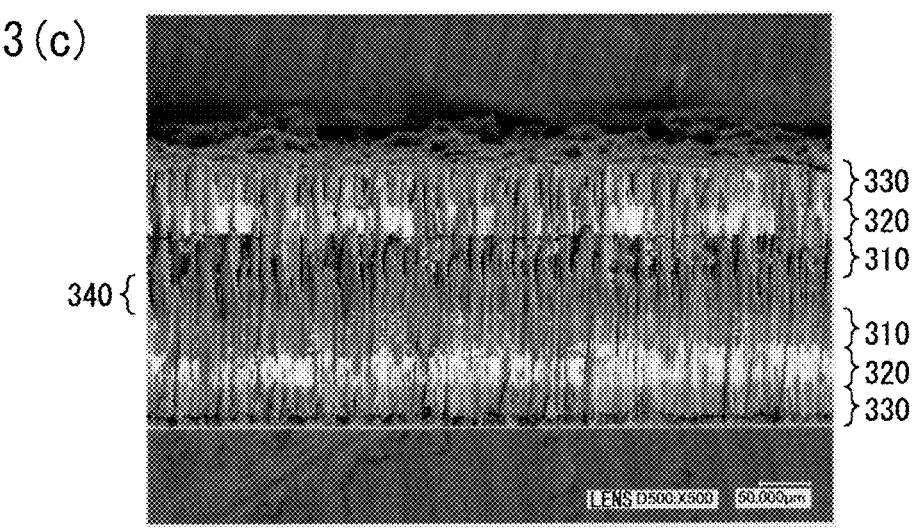
FIG. 3(c) is an SEM image when the side cross-section of the laminate cut by a laser having a wavelength of 0.5 μm is observed by a scanning electron microscope (SEM).

FIG. 3(a) is a schematic front view of the laminate obtained in Reference Example, FIG. 3(b) is a side view of the laminate of FIG. 3(a), and FIG. 3(c) is an SEM image when the side cross-section of the laminate cut by a laser having a wavelength of 0.5 μm is observed by a scanning electron microscope (SEM).

In FIGS. 3(a) and 3(b), the dotted line indicates that the laser having a wavelength of 0.5 μm was irradiated along the dotted line. It is seen from the SEM image of FIG. 3(c), all layers constituting Laminate 1 are cut.

It is noted that in Laminate 1, the positive electrode active material layer 330, the solid electrolyte layer 320 and the negative electrode active material layer 310 are disposed in plane symmetry with respect to the collector layer 340. That is to say, the laser irradiated to the positive electrode active material layer 330 cuts the positive electrode active material layer 330, the solid electrolyte layer 320, the negative electrode active material layer 310 and the collector layer 340. The laser that cut the collector layer 340 subsequently cuts the negative electrode active material layer 310, the solid electrolyte layer 320 and the positive electrode active material layer 330, whereby all layers of Laminate 1 are cut.

Accordingly, it is understood that by the laser having a wavelength of 0.5 μm, cutting occurs in order of the positive electrode active material layer 330 and the solid electrolyte layer 320 and cutting occurs in order of the negative electrode active material layer 310 and the solid electrolyte layer 320.

Example 1

Figure 4A:
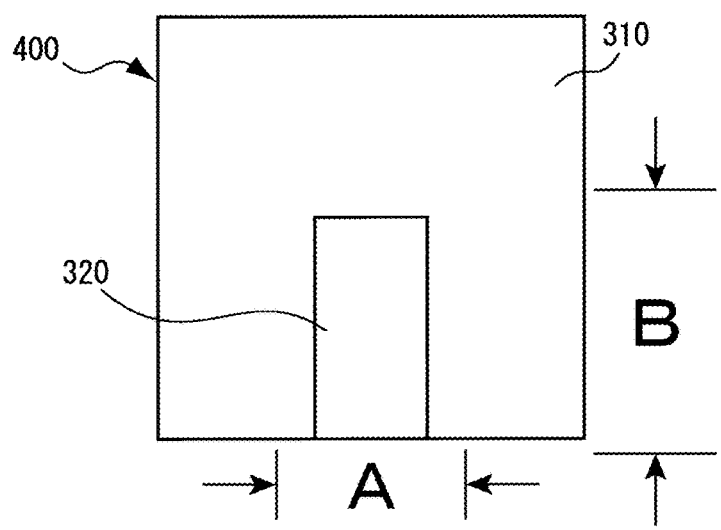
FIG. 4(a) is a schematic front view of part of the laminate obtained in Example 1.
Figure 4B:
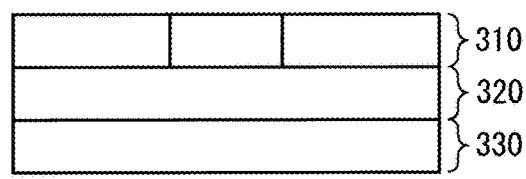
FIG. 4(b) is a side view of the laminate of FIG. 4(a)
Figure 4C:
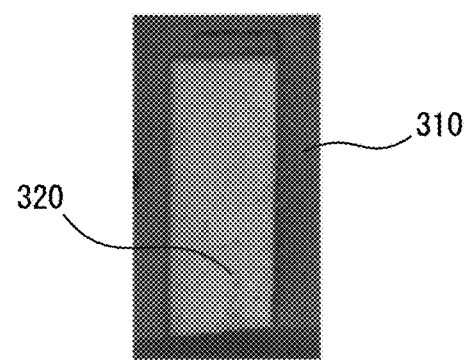
FIG. 4(c) is a front photograph of the A-B portion of the laminate of FIG. 4(a)
Figure 4D:
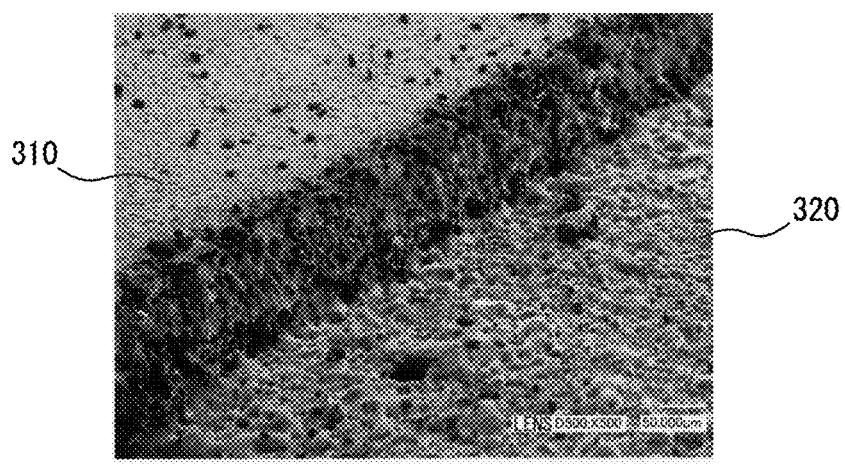
FIG. 4(d) is an SEM image when the laminate of FIG. 4(c) is viewed obliquely.

FIG. 4(a) is a schematic front view of part of the laminate obtained in Example 1, FIG. 4(b) is a side view of the laminate of FIG. 4(a), FIG. 4(c) is a front photograph of the A-B portion of the laminate of FIG. 4(a), and FIG. 4(d) is an SEM image when the laminate of FIG. 4(c) is viewed obliquely.

In FIGS. 4(a) and 4(b), the removing portion of the negative electrode active material layer 310 is schematically shown. It is seen from FIGS. 4(a) to 4(c) that while part of the negative electrode active material layer 310 is removed, part of the solid electrolyte layer 320 remains without being removed.

It is believed that by virtue of the laser reflectance by the solid electrolyte solution being 80% or more, part of the laser is transmitted through the negative electrode active material layer and/or the direct laser are reflected from the solid electrolyte layer. This results in a high probability that breakage, etc., of part of the solid electrolyte layer is efficiently prevented.

In particular, FIG. 4(d) clearly shows the boundary between the negative electrode active material layer 310 and the solid electrolyte layer 320. It is seen from FIG. 4(d) that part of the negative electrode active material layer 310 present on the surface of the solid electrolyte layer 320 is removed by a laser and at the same time, the solid electrolyte layer 320 is prevented from breakage, etc.

It is believed that with respect to the laser having a wavelength of 1.0 μm, the laser reflectance by the solid electrolyte layer is higher by 50% or more, particularly, 56% or more, than the laser reflectance by the first active material layer. That is to say, such a difference in the reflectance is believed to enable the laser to efficiently be incident into the first active material layer and to enable the solid electrolyte layer to efficiently reflect the laser, leading to enhancement of the effect of preventing breakage, cutting or removal of part of the solid electrolyte layer while removing part of the first active material layer.

Example 2

Figure 5A:
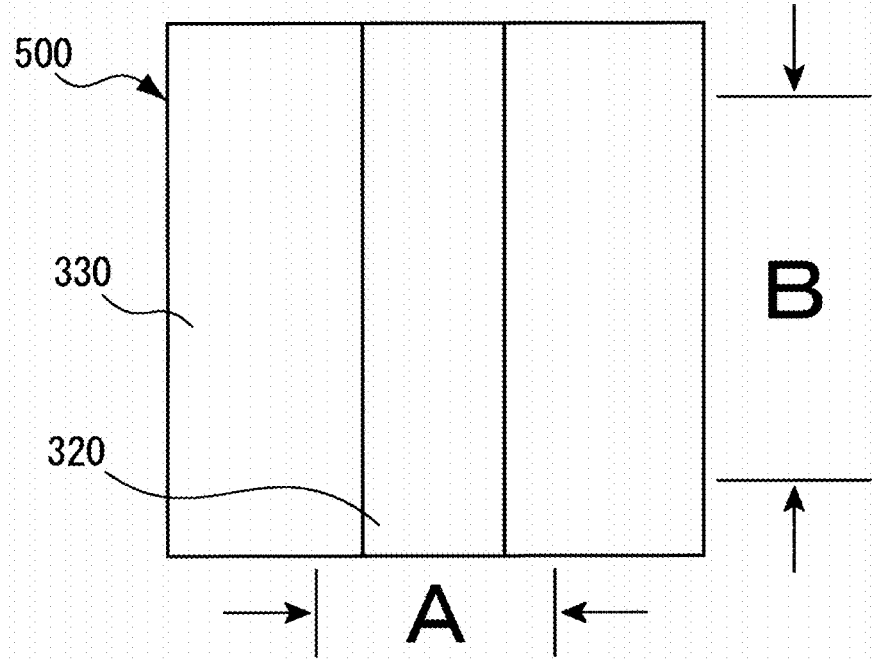
FIG. 5(a) is a schematic front view of part of the laminate obtained in Example 2.
Figure 5B:
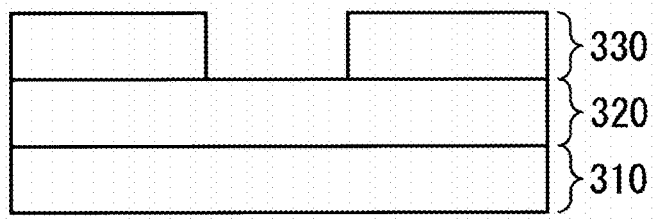
FIG. 5(b) is a side view of the laminate of FIG. 5(a)
Figure 5C:
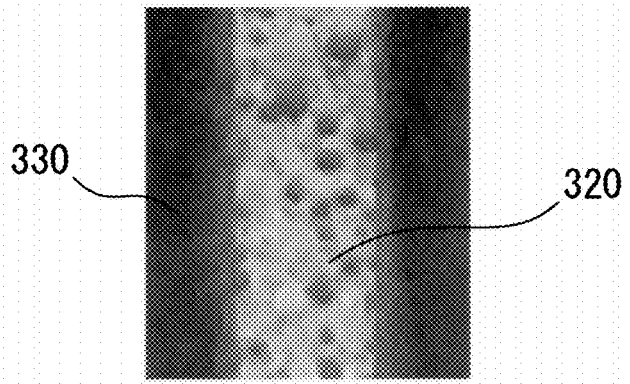
FIG. 5(c) is a front photograph of the A-B portion of the laminate of FIG. 5(a).

FIG. 5(a) is a schematic front view of part of Laminate 1 when Laminate 1 is irradiated with a laser having a wavelength of 1.0 μm from the positive electrode active material layer side and thereby part of the positive electrode active material layer is removed. FIG. 5(b) is a side view of FIG. 5(a) and FIG. 5(c) is a front photograph of the A-B portion of FIG. 5(a).

In FIGS. 5(a) and 5(b), the removing portion of the positive electrode active material layer 330 is schematically shown. It is seen from FIGS. 5(a) to 5(c) that while part of the positive electrode active material layer 330 is removed, part of the solid electrolyte layer 320 remains without being removed.

It is believed that this occurs because the laser reflectance by the solid electrolyte solution is 80% or more, particularly, 82% or more, and because the laser reflectance by the solid electrolyte layer is larger by 71% or more than the laser reflectance by the positive electrode active material layer.

While preferred embodiments have been described, it will be understood by one skilled in the art that changes can be made to the apparatus or chemicals, manufacturers and grades thereof, position and arrangement of the production line, etc.

What is claimed is:

1. A production method of a laminate for a battery in which a first active material layer and a solid electrolyte layer are stacked with each other, the method comprising:
   irradiating a laser to the laminate from a side of the laminate faced by the first active material layer to remove a part of the first active material layer while maintaining the solid electrolyte layer intact,
   wherein a reflectance of the laser by the solid electrolyte layer is 80% or more, and wherein the reflectance is a value obtained by irradiating light having a same wavelength as a wavelength of the laser, to each of a reference and the solid electrolyte layer, measuring reflected light intensities ($I_{reference}$ and $I_{solid\ electrolyte\ layer}$), and then calculating the reflectance from the reflected light intensities according to the following formula (I):

$$\text{Reflectance (\%)} = (I_{solid\ electrolyte\ layer}/I_{reference}) \times 100 \quad (I).$$

2. The method according to claim 1, wherein the reflectance of the laser by the solid electrolyte layer is larger by 50% or more than a reflectance of the laser by the first active material layer.

3. The method according to claim 1, wherein a reflectance of the laser by the first active material layer is 30% or less.

4. The method according to claim 1, wherein the laser is at least one of a solid laser, a gas laser, a liquid laser, and a semiconductor laser.

5. The method according to claim 1, wherein the solid electrolyte layer contains at least one solid electrolyte selected from the group consisting of a sulfide-based amorphous solid electrolyte, a sulfide-based crystalline solid electrolyte, an oxide-based amorphous solid electrolyte, a crystalline oxide, a crystalline oxynitride, and a combination thereof.

6. The method according to claim 1, wherein the laminate further has a second active material layer stacked on a second side of the solid electrolyte layer opposite a first side of the solid electrolyte layer on which the first active material layer is stacked.

7. The method according to claim 6, wherein the laminate further has a collector layer stacked on the second active material layer.

8. The method according to claim 6, wherein after the irradiation with the laser, an area of a stacking surface of the first active material layer is smaller than an area of a stacking surface of the second active material layer.

9. The method according to claim 6, wherein the first active material layer is a positive electrode active material layer and the second active material layer is a negative electrode active material layer.

10. The method according to claim 1, further comprising drying a slurry laminate having stacked therein, in order, a first active material slurry layer and a solid electrolyte slurry layer, to form the laminate in which the first active material layer and the solid electrolyte layer are stacked with each other.

11. The method according to claim 6, further comprising drying a slurry laminate having stacked therein, in order, a first active material slurry layer, a solid electrolyte slurry layer and a second active material slurry layer, to form the laminate in which the first active material layer, the solid electrolyte layer and the second active material layer are stacked with each other.

12. An all-solid battery comprising a laminate for a battery produced by the method according to claim 1.

13. A production method of a laminate for a battery in which a first active material layer is stacked on a first side of a solid electrolyte layer, the method comprising:
   irradiating a laser beam to the laminate from the first side of the solid electrolyte layer on which the first active material layer is stacked to remove a part of the first active material layer,
   wherein at least 80% of the laser beam that reaches the solid electrolyte layer after removing the part of the first active material layer is reflected by the solid electrolyte layer as a result of a reflectance of the laser by the solid electrolyte layer being 80% or more,
   wherein the reflectance is a value obtained by irradiating light having a same wavelength as a wavelength of the laser, to each of a reference and the solid electrolyte layer, measuring reflected light intensities ($I_{reference}$ and $I_{solid\ electrolyte\ layer}$), and then calculating the reflectance from the reflected light intensities according to the following formula (I):

$$\text{Reflectance (\%)} = (I_{solid\ electrolyte\ layer}/I_{reference}) \times 100 \quad (I).$$

14. The method according to claim 13, wherein a reflectance of the laser beam by the solid electrolyte layer is larger by 50% or more than a reflectance of the laser beam by the first active material layer.

15. The method according to claim 13, wherein no more than 30% of the laser beam is reflected by the first active material layer.

16. The method according to claim 13, wherein the laser beam is controlled, based on a material of the solid electrolyte layer, so that at least 80% of the laser beam that reaches the solid electrolyte layer after removing the part of the first active material layer is reflected by the solid electrolyte layer.

* * * * *